(12) United States Patent
Schneider et al.

(10) Patent No.: US 8,282,039 B2
(45) Date of Patent: Oct. 9, 2012

(54) DEVICE FOR STORING LIFE VESTS IN A VEHICLE CABIN

(75) Inventors: Uwe Schneider, Jork Koenigreich (DE);
Quang-Hoa Le, Mannheim (DE)

(73) Assignee: Airbus Operations GmbH, Hamburg (DE)

( * ) Notice: Subject to any disclaimer, the term of this patent is extended or adjusted under 35 U.S.C. 154(b) by 266 days.

(21) Appl. No.: 12/726,102

(22) Filed: Mar. 17, 2010

(65) Prior Publication Data

US 2010/0237191 A1 Sep. 23, 2010

Related U.S. Application Data

(60) Provisional application No. 61/160,788, filed on Mar. 17, 2009.

(30) Foreign Application Priority Data

Mar. 17, 2009 (DE) .......................... 102009013555

(51) Int. Cl.
*B64D 11/00* (2006.01)
*B64D 13/00* (2006.01)
(52) U.S. Cl. .................................. 244/118.5
(58) Field of Classification Search ............... 244/118.5; 206/803; 114/42, 125
See application file for complete search history.

(56) References Cited

U.S. PATENT DOCUMENTS

| 3,647,165 | A | * | 3/1972 | Whitla | 244/118.5 |
|---|---|---|---|---|---|
| 4,577,262 | A | * | 3/1986 | Buteaux | 362/155 |
| 4,766,893 | A | | 8/1988 | Drews | |
| 4,883,242 | A | * | 11/1989 | Becker et al. | 244/118.5 |
| 5,441,218 | A | * | 8/1995 | Mueller et al. | 244/118.1 |
| 6,816,087 | B2 | * | 11/2004 | Lane | 340/945 |
| 6,929,218 | B1 | * | 8/2005 | Sanford et al. | 244/118.5 |
| 7,077,466 | B2 | | 7/2006 | Foestner et al. | |
| 7,111,808 | B2 | * | 9/2006 | Sprenger | 244/118.5 |
| 7,252,569 | B2 | * | 8/2007 | Everhart et al. | 441/80 |
| 2002/0020652 | A1 | * | 2/2002 | Martinez | 206/470 |
| 2006/0145003 | A1 | * | 7/2006 | Bardel et al. | 244/118.5 |
| 2008/0078869 | A1 | * | 4/2008 | Kneller et al. | 244/118.5 |
| 2008/0078870 | A1 | * | 4/2008 | Kneller et al. | 244/118.5 |
| 2008/0078871 | A1 | * | 4/2008 | Munson et al. | 244/118.5 |
| 2010/0044509 | A1 | * | 2/2010 | Helfrich et al. | 244/118.5 |
| 2010/0288880 | A1 | * | 11/2010 | Bachelard et al. | 244/118.5 |
| 2010/0294885 | A1 | * | 11/2010 | Bloch et al. | 244/118.5 |
| 2011/0146686 | A1 | * | 6/2011 | Schneider et al. | 128/205.25 |

FOREIGN PATENT DOCUMENTS

| DE | 3604857 C1 | 8/1987 |
|---|---|---|
| DE | 10143438 A1 | 3/2003 |
| DE | 102007007856 A1 | 8/2008 |
| WO | 2008098779 A1 | 8/2008 |

* cited by examiner

*Primary Examiner* — Tien Dinh
*Assistant Examiner* — Michael A Fabula
(74) *Attorney, Agent, or Firm* — Ingrassia Fisher & Lorenz P.C.

(57) ABSTRACT

A device is provided for storing at least one emergency equipment item. The device includes, but is not limited to at least one receptacle that is positioned above passenger seats and respectively provided with an access opening and at least one closure element for closing the access opening. In order to provide simpler access, at least one emergency equipment item is held in the receptacle and connected to a pulling element that protrudes from the access opening when the closure element is opened. The closure element may be opened and closed by means of a remote-controlled locking mechanism on the receptacle.

12 Claims, 6 Drawing Sheets

DEVICE FOR STORING LIFE VESTS IN A VEHICLE CABIN

CROSS-REFERENCE TO RELATED APPLICATIONS

This application claims the benefit of the filing date of German application 102009013555.3 filed on Mar. 17, 2009 and of U.S. Provisional Patent Application No. 61/160,788 filed on Mar. 17, 2009, the disclosure of which applications is hereby incorporated herein by reference.

TECHNICAL FIELD

The invention relates to a device for storing at least one emergency equipment item, the use of such a device in a vehicle, as well as a vehicle with at least one such device.

BACKGROUND

In a larger vehicle, particularly a passenger aircraft, emergency equipment items for on-board passengers such as, for example, life vests are carried along for use in an unfortunate event such as capsizing, emergency landings, emergency water landings, or the like. Life vests are predominantly stored in open storage compartments underneath passenger seats such that they may be easily taken hold of by passengers seated in the passenger seats in case of need.

Due to approval regulations, it must be ensured that a life vest is situated underneath each passenger seat of a commercial aircraft before each flight. This is realized in the form of a visual inspection by a flight attendant before the passengers enter the cabin of the aircraft. Due to the concealed placement of the life vests underneath the passenger seats, this is a laborious and time-consuming procedure because it is necessary to look and/or feel underneath each passenger seat.

If life vests are stowed underneath the passenger seats, one commonly encountered problem is that passengers occasionally remove life vests unnoticeably and carry them out of the cabin of the aircraft. Due to the inferior visibility, it is hardly possible to monitor all storage compartments underneath the passenger seats for the purpose of theft prevention.

One solution in this respect could be the utilization of special seat cushions that may also be used as life vests. In this case, the seat cushion needs to be removed from the respective seat and carried along to an emergency exit. However, this may not be considered as an ideal permanent solution, but rather merely a particularly cost-efficient remedy.

Another solution to this problem could be the arrangement of a receptacle that may be closed with a lid above each passenger seat as described in DE 3 604 857 C1, where the receptacle contains a packsack with a life vest and may be opened by the passenger in case of need. In case of a panic, this may not necessarily be a smooth procedure because the passengers could possibly be unable to open the receptacle and remove the life vest due to a loss of self-control.

Another problem of the aforementioned solution may be that, in order to ensure sufficient accessibility, the receptacles above the passenger seats would also have to be shifted in fast reconfigurable cabins, in which the passenger seats may be shifted from one mounting point to another mounting point.

At least one object of the invention may therefore be seen in proposing a device for storing emergency equipment items, in which it may be ensured that a life vest or the like is presented to each passenger within a reconfigurable cabin such that it may be accessed easily and preferably without requiring excessive self control on the part of the passengers.

Likewise, a sufficient protection against theft needs to be ensured in order to prevent the unnoticed removal of life vests or other emergency equipment items. In addition, other objects, desirable features, and characteristics, will become apparent from the subsequent summary and detailed description, and the appended claims, taken in conjunction with the accompanying drawings and this background.

SUMMARY

A device for storing at least one emergency equipment item according to an embodiment of the invention may feature at least one receptacle that is positioned above passenger seats and respectively provided with an access opening and at least one closure element for closing the access opening. One particular advantage of this may be seen in that the at least one receptacle accommodates at least one emergency equipment item connected to a pulling element that protrudes from the access opening when the closure element is opened. It would therefore be possible, for example, for the pulling element to drop out of an opened receptacle by a certain distance such that it may be taken hold of by a person seated in the passenger seat arranged underneath the receptacle. Accordingly, it may not be necessary to align each receptacle of the device in such a way that the respective emergency equipment items in the receptacles are respectively arranged directly above an assigned passenger. Emergency equipment items may also be reached over a greater distance and taken hold of at the pulling element in order to be removed from the receptacle. When the receptacle is opened, the respective pulling element preferably may extend to a point situated slightly above the heads of the passengers seated in the passenger seats.

It is also particularly advantageous that the individual receptacles may already be delivered to the equipment installation of a craft in a prefabricated, assembled and inspected fashion such that a complex integration of emergency equipment items within the cabin of the craft may be eliminated during the equipment installation. The cabin of the craft therefore may be blocked for a shorter period of time and additional steps may be carried out faster.

The closure element may be opened from a central location within the cabin by means of a remote-controlled locking mechanism. In case of an emergency, it would be possible, for example, to open all receptacles in the cabin simultaneously when a single button is pressed—for example by a pilot in an aircraft cockpit, at a Flight Attendant Panel in an aircraft cabin, at a control station in a watercraft and the like. Consequently, it may no longer be necessary for each passenger to independently open a receptacle in his vicinity manually.

In one preferred additional development of the device according to an embodiment of the invention, several receptacles may be arranged adjacent to one another in order to form a channel-like structure parallel to the longitudinal direction of the cabin such that emergency equipment items essentially may be accommodated along the entire cabin.

In another preferred embodiment of the device according to the invention, the receptacle may be arranged in a depression or recess of an overhead storage compartment. Due to this measure, the external appearance of the cabin may be improved, as well as designed in a harmonious and uniform fashion. An arrangement adjacent to an overhead storage compartment may also be advantageous for the same reasons.

In one preferred embodiment of the device according to the invention, the closure element may consist of a hinged lid, wherein the locking mechanism is designed for holding the closure element in a position, in which it covers the access opening, and for automatically pivoting the closure element into an open position when it is actuated. This simplifies the construction of the closure element and of the device invention in general such that costs and efforts may be reduced.

In another preferred embodiment, it may be particularly advantageous to couple the locking mechanism with at least one activating means, wherein the activating device or activating means could have a mechanical or electronic switch.

It may also be advantageous to link at least two activating means by means of an OR function so that the receptacle may also be opened with the aid of an alternative activating device.

This alternative second activating device may be situated in a region underneath the receptacle to be opened and also actuated by a passenger. This alternative activating device may also be connected to an alarm device that signals the opening of the receptacle with the aid of this alternative activating device.

For safety reasons, it may be advantageous if each cover of a receptacle could also be opened by a passenger with the aid of a separate remote release. This may make it possible, for example, to couple the central remote release actuated by a flight attendant with an individual release on a passenger seat by means of an OR circuit.

It may furthermore be advantageous to mount the emergency equipment item with the aid of a holding means or holder that is fixed in the receptacle on one side and is adapted for being torn off. If the emergency equipment item should be removed, it may be possible to pull on the pulling element in order to irreversibly tear the holder out of the receptacle.

The holder may be advantageously realized, in particular, in the form of a packaging means or package. For example, packaged emergency equipment items could be successively arranged in a row in the receptacle and fixed such that they may be torn off. When the closure element is opened, the emergency equipment items may drop from the receptacle through the access opening by a distance that is defined by the size of the package and may be taken hold of by the passengers. In this case, it may particularly preferred to arrange the pulling element in the form of a strap or the like on the package because the emergency equipment items are optimally protected in this fashion when they are not in use.

The at least one object, other objects, desirable features and characteristics may ultimately also be met by a use, as well as a vehicle with at least one device according to an embodiment of the invention.

BRIEF DESCRIPTION OF THE DRAWINGS

The present invention will hereinafter be described in conjunction with the following drawing figures, wherein like numerals denote like elements, and.

FIG. 3 shows a detail of a cabin of a vehicle with the device according to an embodiment of the invention in the opened state and with life vests suspended there from;

FIGS. 5a and 5b show a device according to an embodiment of the invention in the opened state with life vests suspended there from.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
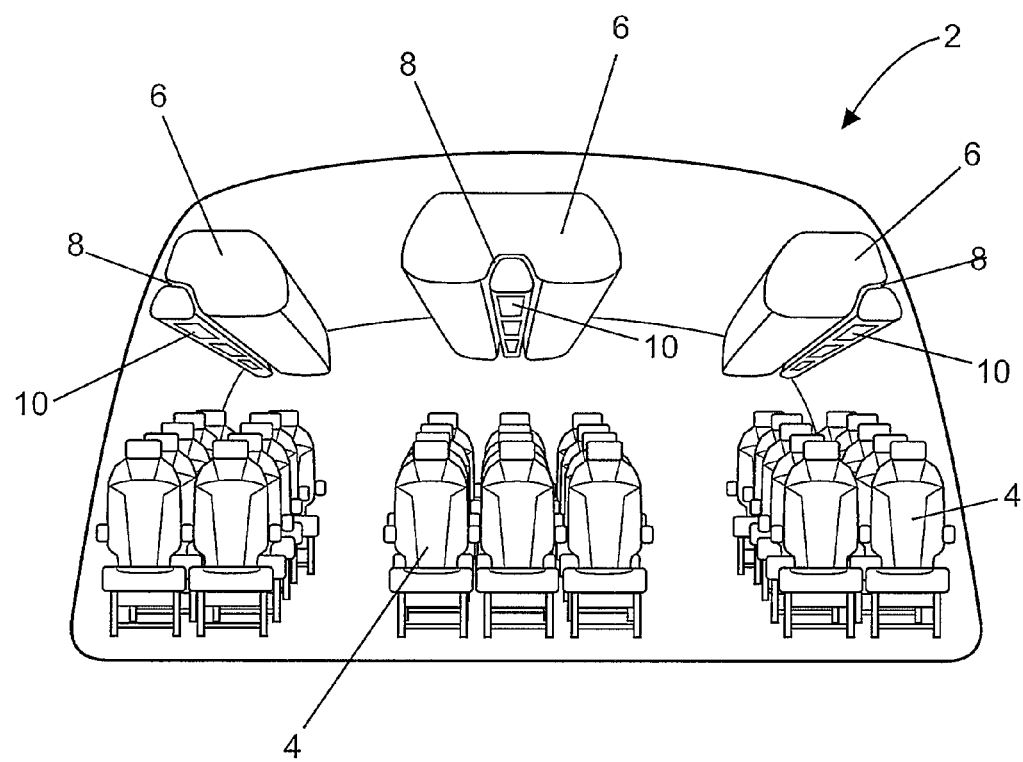
FIG. 1 shows a detail of a cabin of a vehicle with a device according to an embodiment of the invention in the closed state.

FIG. 1 shows a cabin 2 of a vehicle, in which several passenger seats 4 and overhead storage compartments 6 are arranged. In this example, the overhead storage compartments 6 contain depressions 8, in which receptacles 10 are arranged. The receptacles 10 are arranged adjacent to one another along the longitudinal direction or longitudinal axis of the cabin 2 and thusly form a channel-like structure that could also be referred to as "life vest channel."

Figure 2:
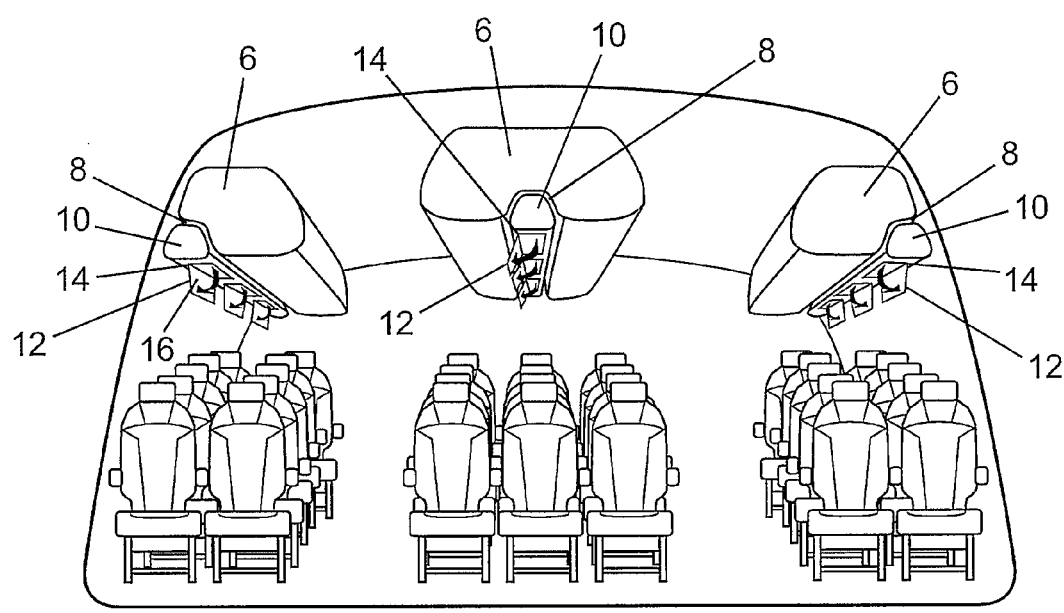
FIG. 2 shows a detail of a cabin of a vehicle with a device according to an embodiment of the invention in the opened state.

According to FIG. 2, the individual receptacles 10 are respectively provided with a closure element 12 in the form of a hinged cover that is supported in a merely exemplary fashion on a hinge 14 arranged parallel to the longitudinal direction of the cabin 2. The closure element may be closed or opened in order to uncover or close an access opening 16 to the respective receptacle 10.

Figure 3:
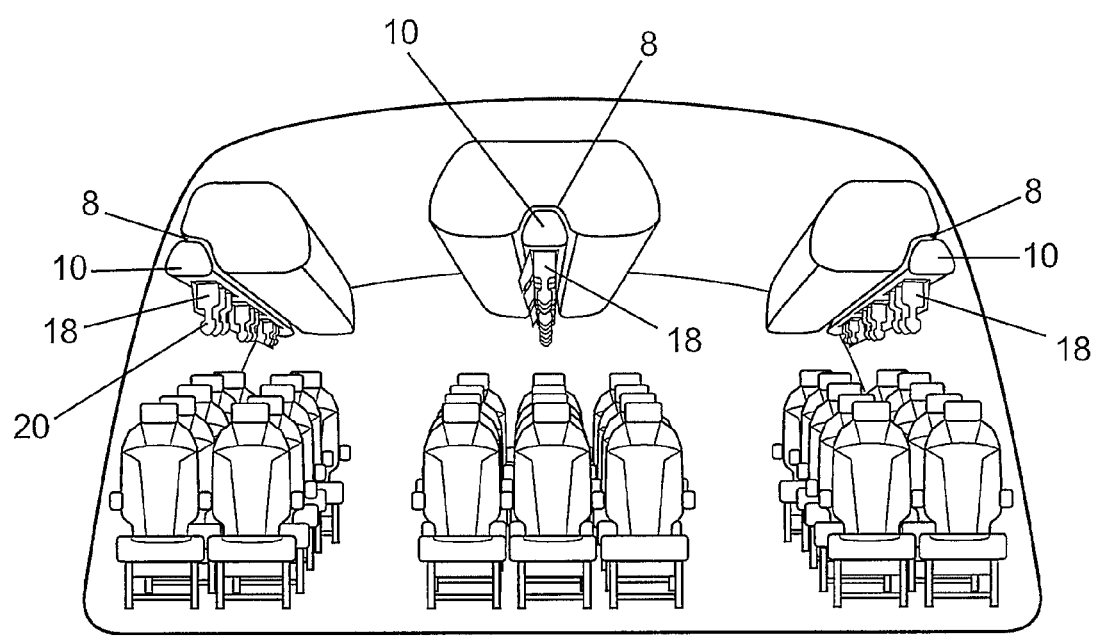

According to FIG. 3, the receptacles respectively contain a series of emergency equipment items 18 that are realized in the form of life vests and may be accessed through the access openings 16. The emergency equipment items 18 may, for example, be at least sectionally arranged equidistantly such that, for example, a higher packing density along the longitudinal direction is specified in the Economy Class than in the Business Class or in the first class. The device according to an embodiment of the invention does not require shifting of the receptacles 10 if the cabin is reconfigured, i.e., if the passenger seats 4 are shifted along the longitudinal direction of the cabin, because the suspended and protruding emergency equipment items 18 and the corresponding pulling elements 20 arranged on the emergency equipment items 18 ensure accessibility even if the respective passenger seat 4 is not directly situated underneath the corresponding emergency equipment item 18.

Figure 4A:
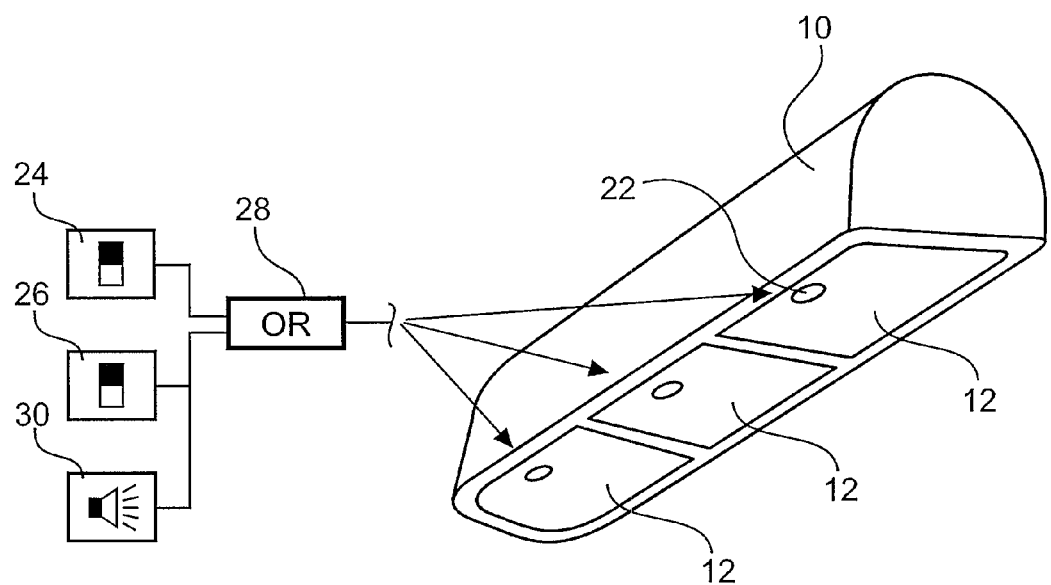
FIGS. 4a and 4b show a device according to an embodiment of the invention in the closed state with life vests arranged therein.

According to FIG. 4a, a receptacle 10 may be realized in the form of an enclosed receptacle with three closure elements 12. This individual receptacle 10 could already be completely equipped and inspected prior to the equipment installation of the craft and merely needs to be mounted in the cabin 2 of the vehicle during the equipment installation. It should be clear to a person skilled in the art that it is also possible to realize shorter or longer receptacles 10 with more or fewer or different types of closure elements 12. It should also be clear that the closure elements 12 could have two or more parts.

Figure 4B:
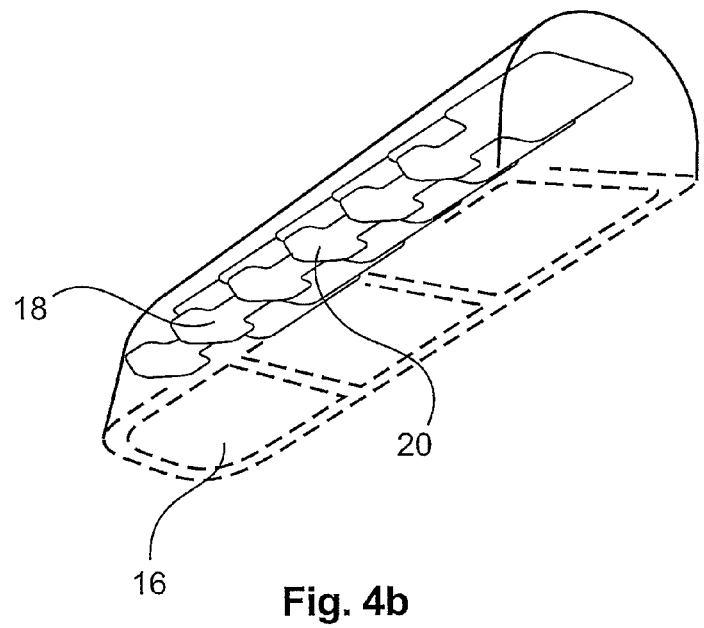

FIG. 4b shows that the emergency equipment items 18 with the corresponding pulling elements 20 are stacked or packed in a row and may be taken hold of through the access openings 16 when the closure elements 12 are opened.

In order to cause the opening or the locking of the closure elements 12, each receptacle 10 features a locking mechanism 22 that is merely illustrated symbolically and may be actuated in a remote-controlled fashion with the aid of an activating means or first activating device 24. Alternatively, it would also be possible to use a second activating means 26 or activating device that is linked to the first activating device 24, for example, by means of an OR function 28. This remote control not only makes it possible to ensure that all closure elements 12 may be opened, for example, from a central location within the cabin of the craft, but this remote control may also be coupled with an alarm device 30 or the like in order to prevent the unnecessary removal of an emergency equipment item 18.

The locking mechanism 22 may be realized in different ways, wherein it would be conceivable, for example, to use electromechanical locking devices, in which motors, magnets or the like are able to activate or deactivate a locking bar or a magnetic lock.

Figure 5A:
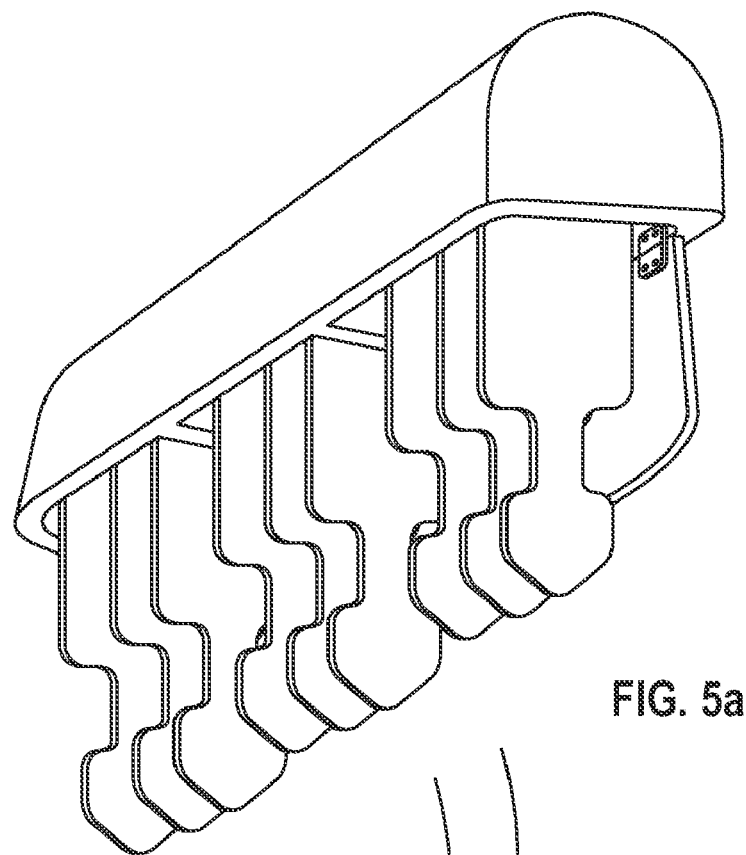
Figure 5B:
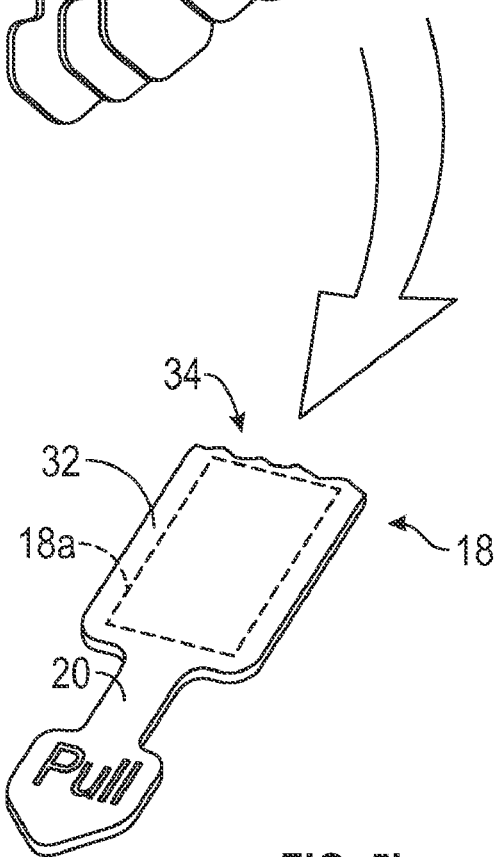

FIG. 5a shows a receptacle 10, on which all closure elements 12 are opened and the emergency equipment items 18 with the pulling elements 20 are suspended from the access openings 16. The pulling elements 20 are designed in such a way that they may be very easily reached by the passengers seated in the passenger seats 4 situated there under. The emergency equipment items 18 may be removed from the receptacle 10 by pulling on the pulling elements 20. This may be realized, for example, in that the emergency equipment items 18 feature a packaging element 32 that tears at a predetermined location 34. The pulling element 20 is advantageously arranged on the packaging element. The packaging element 32 could be realized in the form of a vacuum packaging that also provides protection for the life vest 18a.

Figure 6:
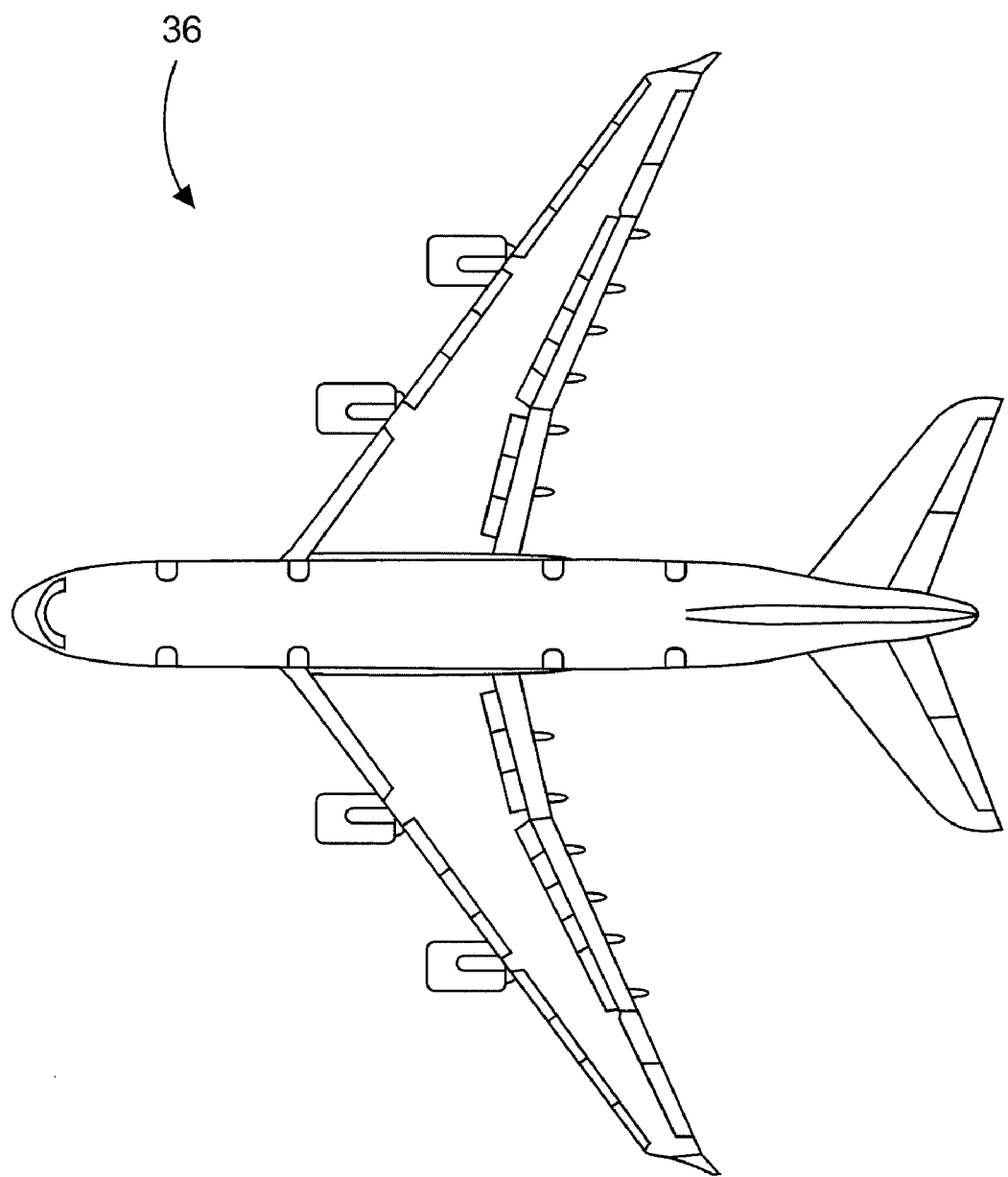
FIG. 6 shows an aircraft with at least one device according to an embodiment of the invention.

FIG. 6 finally shows an aircraft 36 that is equipped with at least one device according to an embodiment of the invention and therefore features, for example, several rows of overhead storage compartments 6, in which receptacles 10 are respectively arranged.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for storing a plurality of life vests, comprising:
a plurality of life vests;
a plurality of receptacles that are positioned above a plurality of passenger seats, arranged adjacent to one another parallel to a longitudinal axis of a cabin and that define a channel-like structure extending along the longitudinal axis of the cabin for holding the plurality of life vests in an overlapping arrangement;
a plurality of access openings respectively provided in each of the plurality of receptacles;
a plurality of hinged covers each for closing a respective one of the plurality of access openings;
a pulling element coupled to each one of the plurality of life vests that protrudes from the plurality of access openings when a respective one of the plurality of hinged covers is opened, with the pulling elements of a sub plurality of the plurality of life vests extending through each of the plurality of access openings when a respective one of the plurality of hinged covers is opened; and
a remote-controlled locking mechanism adapted to open and close the plurality of hinged covers on the plurality of receptacles.

2. The device of claim 1, wherein the plurality of receptacles are arranged in a depression defined by a plurality of overhead storage compartments.

3. The device of claim 1, wherein the plurality of receptacles are arranged in a recess defined by a plurality of overhead storage compartments.

4. The device of claim 1, wherein the plurality of receptacles are arranged adjacent to a plurality of overhead storage compartments.

5. The device of claim 1, wherein the remote-controlled locking mechanism is adapted to hold the plurality of hinged covers in a position that covers the plurality of access openings, and also adapted to automatically pivot the plurality of hinged covers into an open position when actuated.

6. The device of claim 1, wherein the remote-controlled locking mechanism is coupled with a first activating device.

7. The device of claim 6, wherein the remote-controlled locking mechanism is coupled with the first activating device and a second activating device by means of an OR circuit.

8. The device of claim 7, wherein one of the first activating device or the second activating device is positioned on a second passenger seat of the plurality of passenger seats arranged in a vicinity of the plurality of receptacles and another activating device is positioned at a central location in a cabin.

9. The device of claim 1, wherein each life vest of the plurality of life vests is mounted with an aid of a package that is substantially fixed to a side of the respective one of the plurality of receptacles and is adapted to be torn off.

10. The device of claim 9, wherein the pulling element is arranged on the package.

11. A vehicle, comprising:
a plurality of life vests;
a plurality of receptacles that are positioned above a plurality of passenger seats and arranged adjacent to one another, parallel to a longitudinal axis of a cabin of the vehicle that define a channel-like structure extending along the longitudinal axis of the cabin for holding the plurality of life vests in an overlapping arrangement and each of the plurality of receptacles is respectively provided with a plurality of access openings and a plurality of hinged covers each adapted to close a respective one of the plurality of access openings,
wherein the plurality of life vests are held in each of the plurality of receptacles and are each connected to a pulling element that protrudes from the plurality of access openings when each of the plurality of hinged covers is opened, with the pulling elements of a sub plurality of the plurality of life vests extending through each of the plurality of access openings when a respective one of the plurality of hinged covers is opened; and
a remote-controlled locking mechanism is provided for opening or closing each of the plurality of hinged covers arranged on the plurality of receptacles.

12. The vehicle of claim 11, wherein the vehicle is an aircraft.

* * * * *